US006882832B2

(12) United States Patent
Monson

(10) Patent No.: US 6,882,832 B2
(45) Date of Patent: Apr. 19, 2005

(54) FREQUENCY VERIFICATION OF AN AMPLITUDE MODULATED SIGNAL

(75) Inventor: Gavin Martin Monson, Oxford, OH (US)

(73) Assignee: Harris Corporation, Melbourne, FL (US)

( * ) Notice: Subject to any disclaimer, the term of this patent is extended or adjusted under 35 U.S.C. 154(b) by 430 days.

(21) Appl. No.: 10/238,959

(22) Filed: Sep. 10, 2002

(65) Prior Publication Data

US 2004/0048586 A1 Mar. 11, 2004

(51) Int. Cl.[7] .......................... H01Q 11/12; H04B 1/04
(52) U.S. Cl. .................... 455/116; 455/117; 455/127.2
(58) Field of Search ................................ 455/91, 114.2, 455/115.1, 116, 117, 119, 126, 127.1, 127.2, 232.1, 234.1, 234.2, 249.1, 250.1

(56) References Cited

U.S. PATENT DOCUMENTS 4,227,255 A * 10/1980 Carrick et al. ........... 455/226.1
4,583,211 A 4/1986 Nishikawa et al.
4,672,329 A 6/1987 Hikawa
4,802,237 A * 1/1989 Covill ........................ 455/117
4,819,268 A * 4/1989 Kahn .......................... 381/14
5,165,047 A 11/1992 Shimizu
5,533,136 A 7/1996 Smith

FOREIGN PATENT DOCUMENTS

EP 0098349 B1 11/1989

* cited by examiner

*Primary Examiner*—Nguyen T. Vo
(74) *Attorney, Agent, or Firm*—Tarolli, Sundheim, Covell & Tummino L.L.P.

(57) ABSTRACT

An apparatus and method are disclosed for verifying the frequency of an AM carrier signal having a target frequency. The apparatus includes a high frequency clock that produces a clock signal having a higher frequency than the target frequency. A counter is advanced by the clock signal and reset after each cycle of the carrier signal. A first comparison portion compares the value recorded by the counter to a first reference value, and a second comparison portion compares the value recorded by the counter to a second reference value. An error determination portion attenuates the carrier signal if the comparisons conducted by the first and second comparison portions indicate an error condition.

16 Claims, 4 Drawing Sheets

FREQUENCY VERIFICATION OF AN AMPLITUDE MODULATED SIGNAL

BACKGROUND OF THE INVENTION

1. Technical Field

The invention relates to digital amplitude modulated (AM) radio transmitters. Specifically, the invention discloses an apparatus and method for protecting a radio transmission system from off-frequency exciter generated carrier signals.

2. Description of the Prior Art

Although the present invention may be used in any digital AM transmitter, it is particularly useful in a hybrid analog-digital system such as an in-band on-channel broadcasting system (IBOC) or a high definition radio system. Such a system allows the simultaneous broadcast of both an analog amplitude modulated signal and a digital signal on the same channel assignment as an existing AM broadcasting allocation. In such a broadcasting system, a second signal, containing digital data, is split into a number of carriers, which are positioned in the sideband frequencies of the existing AM signal. These carriers are selected and modulated carefully to avoid interference with the original AM signal. For example, the carriers may be encoded to be orthogonal to the AM signal.

FIG. 1 illustrates a simplified version of a prior art digital AM radio transmitter 10 that may be used in a hybrid analog-digital broadcasting system. The system receives analog audio input at an analog/digital converter 12. The analog/digital converter converts this analog audio signal into a digital signal. The digital signal is combined with inputted digital data at a multiplexer 14. In the illustrated example, the signal is multiplexed via an orthogonal frequency division multiplexing technique.

The signal is then subjected to a Fourier Transform at block 16, resulting in a signal divided into two components in quadrature. These components are modulated at a modulator in quadrature 18 with the AM carrier signal. The resulting signal is filtered by a broad bandpass filter 20 to remove any undesired portions of the signal. The signal is then passed to an amplifier 22 where it is amplified and then transmitted at a radio antenna 24.

When a modulated signal varies from its expected carrier frequency by more than a small margin, it is possible that the signal may damage the transmitter. The output portion (network) of a transmitter (i.e. blocks 22 and 24) is tuned to the expected carrier signal frequency. Significant deviations from that frequency can result in high levels of reflected signal power from the input of the output impedance matching network, where it is least likely to be anticipated or protected against. Reflected power is expected to be seen only at the output of the impedance network typically, and reflected power detectors which are included in the typical transmitter system only look for energy reflected from the load; it will not be able to detect energy reflected from the input to the impedance matching network back into the amplifier(s) If the amount of reflected power is sufficiently large, damage to the amplifier modules can result.

In the prior art transmitter illustrated in FIG. 1, a broadband filter, typically an analog filter, is used to attenuate signals that deviate from the expected frequency for the transmitter. While this approach will attenuate signals that vary widely from the expected frequency, the filter, by necessity, covers a fairly large range of frequencies. Thus, a signal may be close enough to the expected frequency to pass through the filter, but still vary from that frequency sufficiently to cause damage.

Likewise, merely monitoring the level of reflected energy is not effective in protecting the transmitter. Reflected power is typically monitored after the matching network within the transmitter, which may or may not show reflected power at that point depending on the load impedance. If the load were a broadband dummy load, for example, the reflected power would be close to zero since it presents a fifty Ohm impedance across a wide bandwidth.

To avoid the difficulties of measuring this reflected power, it would be preferable to ensure that the reflected power is not generated at dangerous levels. Accordingly, it would be desirable to verify the frequency of the carrier signal prior to amplification and attenuate any off-frequency signals.

STATEMENT OF THE INVENTION

To this end, an apparatus is disclosed for verifying the frequency of an AM carrier signal having a target frequency known a priori. The apparatus includes a high frequency clock that produces a clock signal having a higher frequency than the target frequency. The frequency of this high frequency clock may be chosen to give an arbitrarily small measurement resolution as required by the application of the invention. A counter is advanced by the clock signal and reset after each cycle of the carrier signal. A first comparison portion compares the value recorded by the counter to a first reference value, and a second comparison portion compares the value recorded by the counter to a second reference value. An error determination portion attenuates the carrier signal if the comparisons conducted by the first and second comparison portions indicate an error condition.

In accordance with another aspect of the present invention, a method is disclosed for verifying the frequency of an AM carrier signal having an associated target frequency. The number of cycles of a clock signal, with a frequency higher than that of the carrier signal, are counted for one cycle of the carrier signal. The number of counted clock cycles is then compared to a first reference value and a second reference value. The carrier signal is attenuated if the comparisons with the first and second reference values indicate an error condition.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE INVENTION

The present invention may be used with any digital or analog transmitter to protect the transmitter from off-frequency carrier signals. Use with an analog transmitter requires that a low level carrier signal be processed by a zero crossing detector prior to being processed by the invention. As a preferred embodiment, the invention may be used within a hybrid analog-digital broadcasting system, such as an IBOC or high definition radio system.

Figure 1:
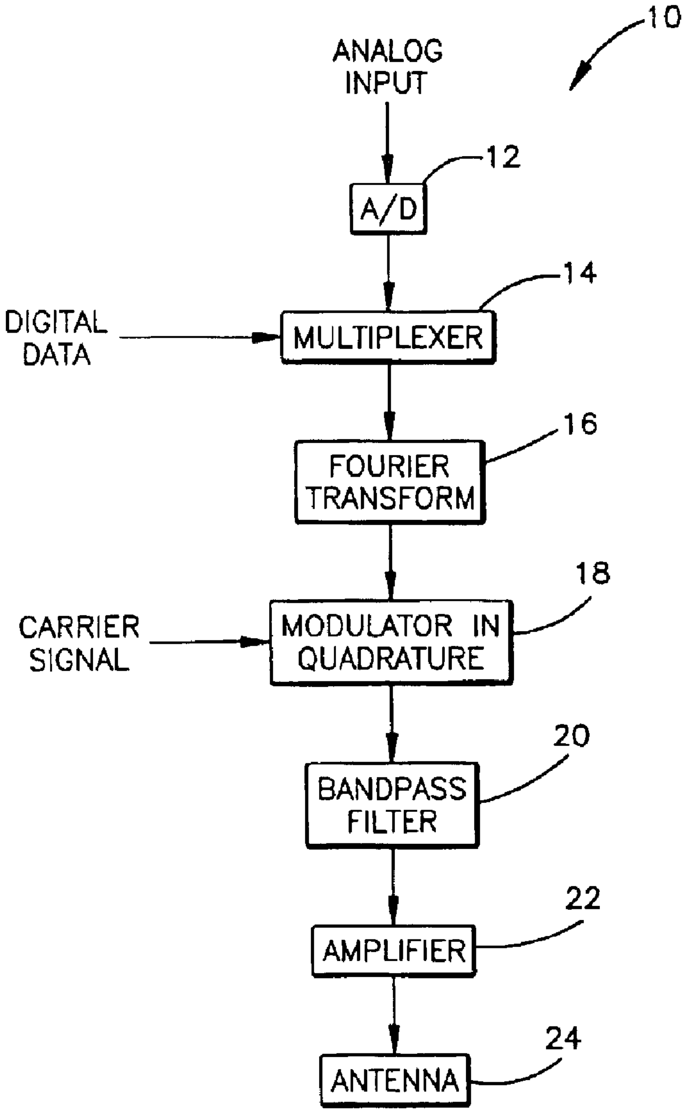
Fig.1 (PRIOR ART)
FIG. 1 is a simplified block diagram of an example prior art digital AM radio transmitter.
Figure 2:
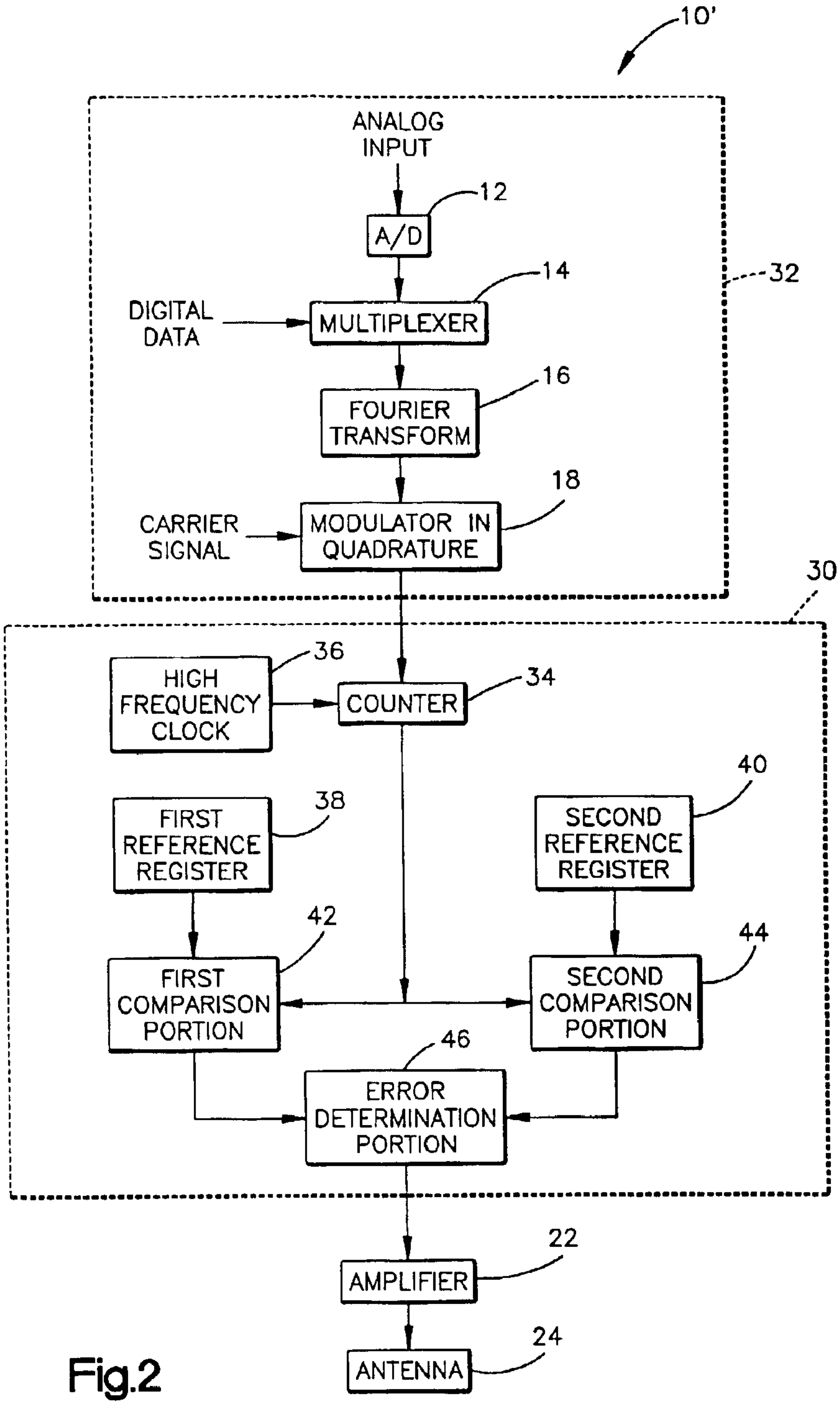
FIG. 2 is a simplified block diagram of an example digital AM radio transmitter incorporating the present invention.

FIG. 2 illustrates the transmitter system 10' of FIG. 1 incorporating a device consistent with the present invention. Replacing the bandpass filter 20 of FIG. 1 is the frequency verification circuit 30 of the present invention. The frequency verification circuit 30 receives a modulated signal with an associated target frequency from the exciter portion 32 of the transmission system. The signal is received at a counter 34 in such a manner as to reset the counter at the rising edge of a cycle of the carrier signal. During each cycle, the counter 34 is advanced by pulses from a high frequency clock 36. The frequency of the clock 36 is intended to be significantly higher than the frequency of the carrier signal, generally around two orders of magnitude. Higher or lower ratios between the two signals are also feasible and are intended to be encompassed within the claimed invention.

After the counter has been advanced for a full cycle, the resulting count is retained and compared to threshold values to determine if the signal is off-frequency. Comparison values are stored within two registers. The first reference register 38 contains a value reflecting the number of cycles of the clock signal that would occur in one cycle of a signal having a predetermined frequency higher than that of the target frequency. The second reference register 40 contains a value reflecting the number of cycles of the clock signal that would occur in one cycle of a signal having a predetermined frequency lower than that of the target frequency.

The count accumulated by the counter 34 is compared to the first reference register 38 at a first comparison portion 42. If the value of counter 34 exceeds that of the first reference register 38, the carrier frequency is smaller than a predetermined threshold frequency. The first comparison portion 42 would thus produce an output indicating that no error exists. If the value produced at the counter 34 fails to exceed the value stored at the first reference register 38, the first comparison portion 42 will produce an output indicating that the carrier signal frequency is too high.

The value stored by the counter 34 is then compared to the second reference register 40 at a second comparison portion 44. If the value of counter 34 is below that of the second reference register 40, the carrier frequency is larger than a predetermined threshold frequency. The second comparison portion 44 would thus produce an output indicate that no error exists. If the value produced at the counter 34 exceeds the value stored at the second reference register 40, the second comparison portion 44 will produce an output indicating that the carrier signal frequency is too low.

The outputs of the first and second comparison portions (42 and 44) are received an at error determination portion 46. If either output indicates an off-frequency carrier signal, the error determination portion 46 determines whether it is necessary to attenuate the carrier signal as a result of the frequency deviation. This decision can be based upon the severity of the deviation from the target frequency, the number of cycles the deviation has continued, or any other relevant factor. After this determination has been made, the signal is passed to the amplifier 22 to be amplified and transmitted at the antenna 24.

Figure 3:
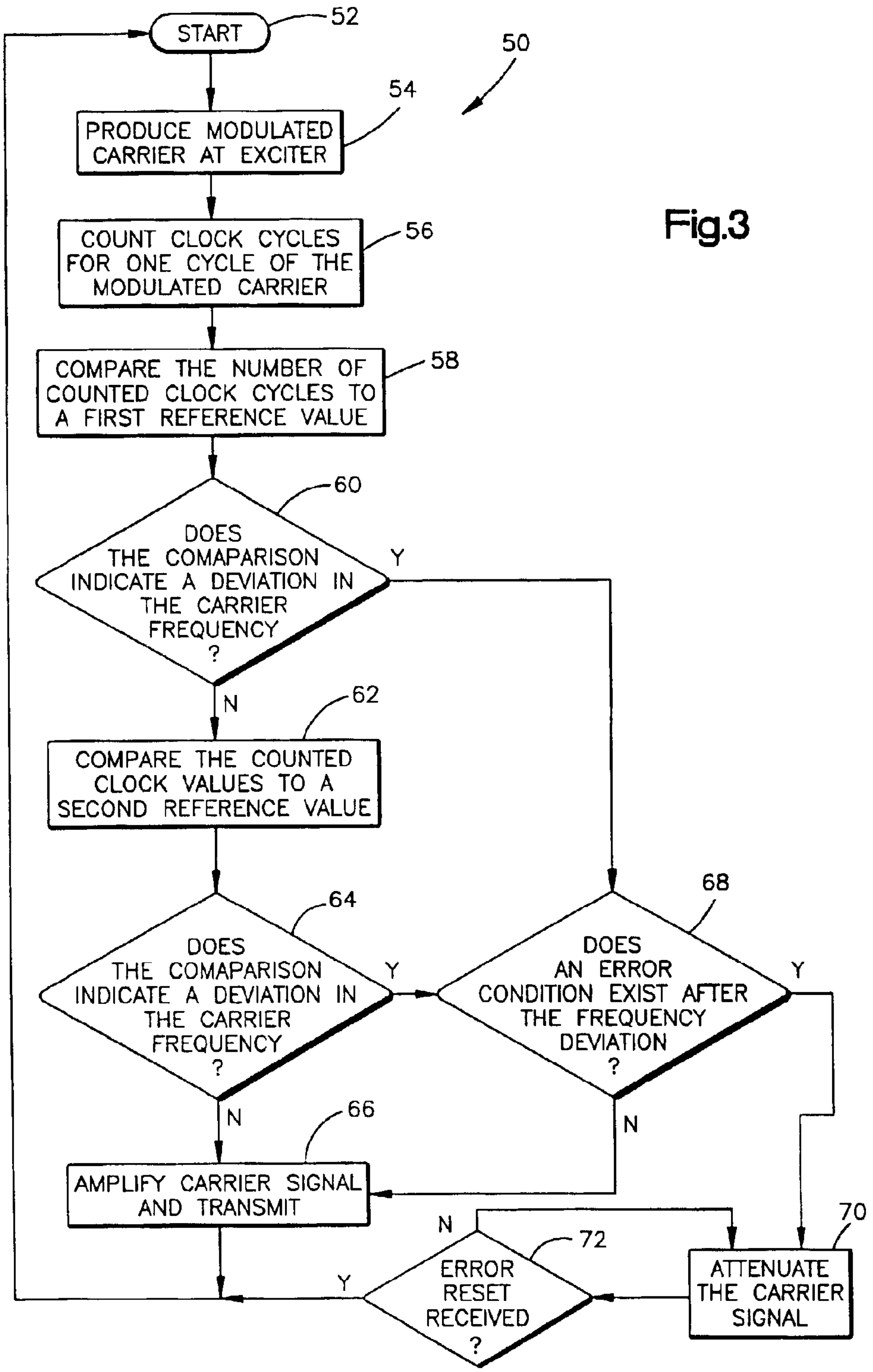
FIG. 3 is a flow diagram illustrating the run-time operation of the present invention.

FIG. 3 is a flow diagram illustrating the run-time operation of the present invention. The process 50 begins at step 52. The process then advances to step 54, where the exciter produces a digital amplitude modulated signal and inputs it to the frequency verification circuit. At step 56, the system counts the number of clock cycles of a high frequency clock that occur during one cycle of the modulated carrier signal. The process then continues at step 58, where this value is compared to a first reference value. At step 60, the system determines if the comparison between the two values indicates an off-frequency carrier signal. For example, the system may find a carrier signal to be outside of an acceptable frequency range where the first reference value is smaller than the number of counted clock cycles.

The process then continues at step 62, where the number of counted clock cycles is compared to a second reference value. At step 64, the system determines if the comparison between the two values indicates an error. For example, the system may find a carrier signal to be outside of an acceptable frequency range where the second reference value is larger than the number of counted clock cycles.

If the modulated carrier signal is within an acceptable range, the process continues to step 66, where the carrier signal is amplified and transmitted. The process then returns to step 52.

If an off-frequency signal is detected at either comparison (steps 60 and 64), the process proceeds to step 68, where the system determines if the off-frequency signal creates an error condition. At this step, the system will apply a decision rule by which the system can determine if an error condition exists. For example, an error condition may exist when a frequency deviation in the carrier signal persists over a specified number of carrier signal cycles. If no error condition is found, the process advances to step 66, where the signal is amplified and transmitted. If an error condition is found, the process proceeds to step 70, where the signal is attenuated. The process then advances to step 72, where the system waits for an error reset signal. Once this is received, the process returns to step 52 to continue processing the incoming carrier signal.

Figure 4:
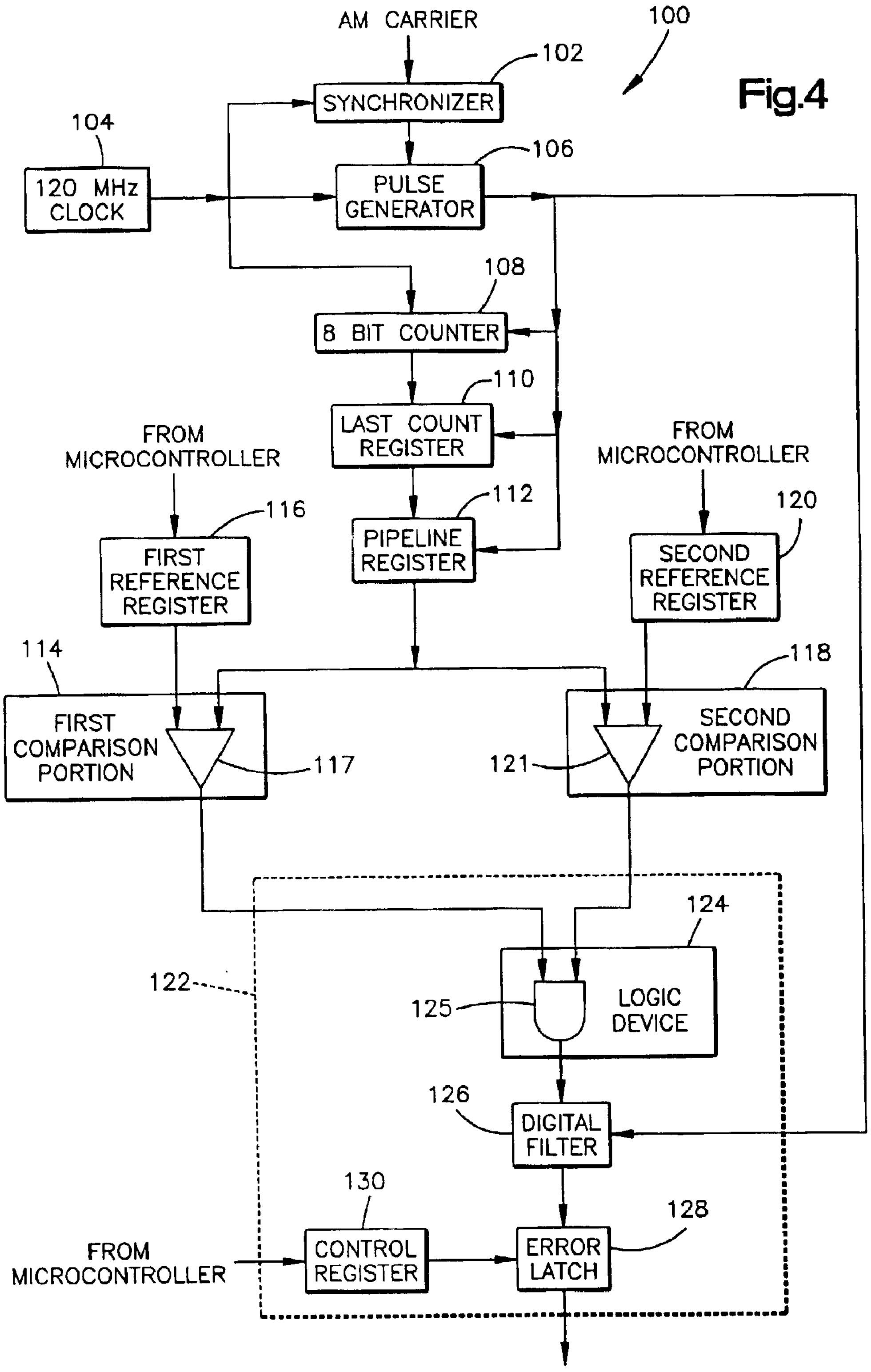
FIG. 4 is a block diagram of an example embodiment of the invention.

In the example embodiment illustrated in FIG. 4, the apparatus 100 monitors an AM carrier signal generated by an IBOC (In-Band On-Channel) exciter and determines whether the signal falls within five percent of a target frequency. This is accomplished by counting the number of 120 MHz clock pulses between rising edges of the AM carrier signal and then comparing this count to a programmable upper and lower limit. The carrier signal is considered off-frequency where the count either exceeds the upper limit or falls below the lower limit. If the carrier signal is off-frequency, the system will determine if it is necessary to attenuate the frequency.

Turning to the specifics of the illustrated apparatus, a modulated carrier signal, with an associated target carrier frequency, from the exciter 32 is received at a synchronizer 102. The synchronizer 102 synchronizes the received carrier signal with a clock signal provided by a high frequency clock 104. Thus, a representation of the carrier signal with approximately the same pulse width as the original (within the width of one clock cycle) and synchronous to the clock 104 is created. This synchronized carrier is used to drive any component in the apparatus that needs to use the AM carrier as an input. The synchronized carrier is used to avoid metastability issues-that can occur with asynchronous input signals.

The high frequency clock 104 provides a stable time reference for the apparatus. In the example embodiment, the clock signal is set at 120 MHz to give the signal sufficient resolution to measure a carrier wave of a frequency up to 2 MHz. Each pulse from the clock 104 represents 1.6% of the period of this 2 MHz wave. Since the AM band includes frequencies ranging from 1.65 MHz to 0.55 MHz, this signal provides good resolution throughout the band of foreseeable carrier signals.

The clock signal and the AM carrier signal are both inputted into a pulse generator 106. The pulse generator 106 provides a pulse of one clock cycle in width upon detecting the rising edge of the AM carrier signal. This rising edge marks the beginning of a carrier cycle. The pulse from the pulse generator 106 is inputted to a counter 108 to reset the counter and begin a count for a new carrier cycle. Pulses from the clock 104 advance the counter 108 in between reset pulses from the pulse generator, measuring the number of clock cycle that pass during each cycle of the AM carrier signal.

Upon the reception of a reset pulse from the pulse generator 106, the number of clock cycles received in the preceding carrier cycle is outputted from the counter 108 to a last count register 110. The last count register 110 stores the count for later analysis. This count is passed to a pipeline register 112. The pipeline register 112 breaks the logic path of the circuit into two portions, one to judge the lower bound of the frequency of the modulated carrier signal and the other to judge the upper bound of the frequency. While breaking the logic path of the device into two shorter paths allows the system to operate at the clock cycle frequency, it introduces a latency of one clock cycle into the error determination of the system. This brief delay does not significantly affect system performance.

The first of the outputs from the pipeline register 112 is provided to a first comparison portion 114. At the first comparison portion 114, the count from the pipeline register 112 is compared to a reference count provided by a first reference register 116. In the example embodiment, the count at the first reference register 116 is supplied by an external microcomputer (not shown) located in the exciter 32. This count is established to reflect a frequency a set percentage higher than that of an expected carrier signal. In the example embodiment, the count contained in the first reference register 116 reflects a frequency five percent higher than the expected frequency associated with the modulated carrier signal. Also in the example embodiment, the first comparison portion 114 includes a comparator 117 that outputs a logic "high" signal until the count from the pipeline register 112 falls below the count from the first reference register 116.

The second of the outputs from the pipeline register 110 signals is provided to a second comparison portion 118. At the second comparison portion 118, the count from the pipeline register 112 is compared to a reference count provided by a second reference register 120. In the example embodiment, the count at the second reference register 120 is supplied by an external microcomputer (not shown) located in the exciter 32. This count is established to reflect a frequency a set percentage lower than that of an expected carrier signal. In the example embodiment, the count contained in the second reference register 116 reflects a frequency five percent lower than the expected frequency associated with the modulated carrier signal. Also in the example embodiment, the second comparison portion 118 includes a comparator 121 that outputs a logic "high" signal until the count from the pipeline register 112 exceeds the count from the second reference register 120.

The outputs of the first and second comparison portions (114 and 118) are outputted to the error determination portion 122. Within the error detection portion 122, the outputs are received at a logic device 124. The logic device 124 determines if the modulated carrier signal frequency remains within the limits recorded in the first and second reference registers (116 and 120). In the example embodiment, the logic device 124 includes an AND gate 125. The AND gate 125 will receive logic "high" signals from the first and second comparison portions (114 and 118) so long as the frequency of the modulated carrier signal remains within acceptable limits. Thus, the output of the AND gate 125 will remain a logic high until an off-frequency signal is detected.

The digital filter 124 inhibits false alarms within the system. Specifically, the digital filter 124 requires that an frequency deviation within the carrier signal persist for a specified amount of time prior to the system taking any action. Obviously, this time period must be long enough to filter out common sources of false alarms, but short enough to prevent damage to the transmitter during the determination of the error condition. It is known from observation of the IBOC digital waveform that instantaneous 180 degree phase shifts or "phase reversals" are commonly present in the IBOC digital waveform and make the frequency appear to the detector to dramatically change instantaneously. The so-called "phase reversal" causes a transition edge of the digital signal to be missing for one cycle only. Two successive "phase reversals" never occur. These are transient effects and should not be flagged as errors. To account for these phase reversals in the example embodiment, an off-frequency signal must be detected for four cycles of the modulated carrier signal before the system determined an error condition and attenuates the off-frequency signal.

This error discrimination is accomplished by the digital filter 126. The digital filter 126 receives input both from the logic device 124 and the pulse generator 106. When the digital filter 126 no longer receives a logic "high" from the logic device 124, it begins to count the pulses received from the pulse generator 106. When three further pulses have been received, the error condition has existed for four cycles of the modulated carrier signal, and the digital filter 126 outputs a signal to an error latch 128 to disable the transmission of the modulated carrier signal. Once the error latch 128 is set to disable further transmission, it remains in this state until reset through a control register 130. The control register 130, like the first and second reference registers (116 and 120), is directly controlled by a microprocessor (not shown) found in the exciter 32.

It should be noted that in the preferred embodiment, no error will be found when a carrier signal is not being received by the system. The digital filter 124 will not function to disable transmission of a carrier signal unless it has received at least four pulses from the pulse generator 108, indicating the passage of four carrier signal cycles. These pulses will not be generated in the absence of a signal. Additionally, if the carrier is interrupted by other sources and then later restored, no error will result since it is the time between edges of the digital signal representing the digital carriers that is important.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, the following is claimed:

1. An apparatus for verifying the frequency of an AM carrier signal having a target frequency, comprising:

a high frequency clock that produces a clock signal having a higher frequency than the target frequency;

a counter that is advanced by the clock signal and reset after each cycle of the carrier signal;

a first comparison portion that compares the value recorded by the counter to a first reference value;

a second comparison portion that compares the value recorded by the counter to a second reference value; and an error determination portion that attenuates the carrier signal if the comparisons conducted by the first and second comparison portions indicate an error condition.

2. An apparatus as set forth in claim 1, wherein the first reference value indicates the number of cycles of the clock signal that would occur during one cycle of a signal having a predetermined frequency higher than that of the target frequency, and the second reference value indicates the number of cycles of the clock signal that would occur during one cycle of a signal having a predetermined frequency lower than that of the target frequency.

3. An apparatus as set forth in claim 2, wherein the predetermined frequency higher than of the target frequency is five percent higher than the target frequency, and the predetermined frequency lower than the target frequency is five percent lower than the target frequency.

4. An apparatus as set forth in claim 1, wherein the first comparison portion outputs a first confirmation signal so long as the number of clock cycles recorded by the counter exceeds a value contained in a first register, and the second comparison portion outputs a second confirmation signal so long as the number of clock cycles recorded by the counter falls below a value contained in a second register.

5. An apparatus as set forth in claim 4, wherein the error determination portion receives the output of the first and second comparison portions and indicates that an error condition exists only when it has failed to receive one or both of the first and second confirmation signals from the first and second comparison portions for a predetermined period of time.

6. An apparatus as set forth in claim 5, wherein the predetermined period of time is the duration of four cycles of the modulated carrier signal.

7. An apparatus as set forth in claim 1, wherein the frequency of the clock signal is 120 MHz.

8. An apparatus as set forth in claim 1, wherein the apparatus is contained in a hybrid analog-digital broadcasting system.

9. A method of verifying the frequency of an AM carrier signal having an associated target frequency, comprising:

counting the number of cycles of a clock signal, with a frequency higher than that of the carrier signal, that occur during one cycle of the carrier signal;

comparing the number of counted clock cycles to a first reference value;

comparing the number of counted clock cycles to a second reference value; and attenuating the carrier signal if the comparisons with the first and second reference values indicate an error condition.

10. A method as set forth in claim 9, wherein the first reference value indicates the number of cycles of the clock signal that would occur during one cycle of a signal having a predetermined frequency lower than that of the target frequency, and the second reference value indicates the number of cycles of the clock signal that would occur during one cycle of a signal having a predetermined frequency higher than that of the target frequency.

11. An method as set forth in claim 10, wherein the predetermined frequency higher than the target frequency is five percent higher than the target frequency, and the predetermined frequency lower than the target frequency is five percent lower than the target frequency.

12. A method as set forth in claim 9, wherein the step of comparing the number of counted clock cycles to a first reference value includes outputting a first confirmation signal so long as the number of counted clock cycles exceeds a value of a first register, and the step of comparing the number of counted clock cycles to a second reference value includes outputting a second confirmation signal so long as the number of counted clock cycles falls below a value of a second register.

13. A method as set forth in claim 12, wherein an error condition exists only when one or both of the first and second confirmation signals fail to be outputted for a predetermined period of time.

14. A method as set forth in claim 13, wherein the predetermined period of time is the duration of four cycles of the modulated carrier signal.

15. A method as set forth in claim 9, wherein the frequency of the clock signal is 120 MHz.

16. A method as set forth in claim 9, wherein the method is practiced in a hybrid analog-digital broadcasting system.

* * * * *